United States Patent Office 3,146,239
Patented Aug. 25, 1964

3,146,239
4-HALO-19-NOR-PROGESTERONE
Howard J. Ringold, Octavio Mancera, and Enrique Batres, Mexico City, Mexico, assignors, by mesne assignments, to Syntex Corporation, a corporation of Panama
No Drawing. Filed Sept. 22, 1958, Ser. No. 762,268
Claims priority, application Mexico Sept. 23, 1957
3 Claims. (Cl. 260—397.3)

The present invention relates to novel cyclopentanophenanthrene derivitives.

More particularly the present invention relates to 4-chloro or 4-bromo-19-nor-progresterone. The novel compounds of the present invention are active progestational type hormones.

In accordance with the present invention it has been discovered that the novel 4-chloro or 4-bromo-19-nor-Δ4-pregnen-3,20-diones may be prepared by epoxidizing the double bond of 19-nor-progesterone followed by the opening of the epoxide ring with hydrochloric or hydrobromic acid.

The novel compounds of the present invention have the following formula:

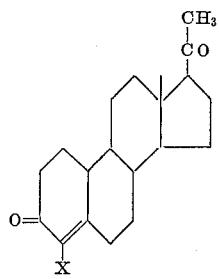

In the above formula X represents chlorine or bromine.
The above novel compounds are prepared by a process illustrated by the following formula:

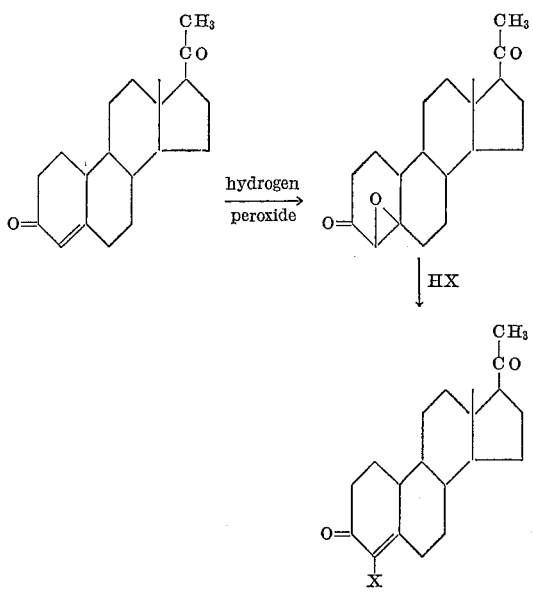

In the above equation X represents bromine or chlorine as heretofore.

In practicing the process above set forth 19-nor-progesterone is reacted with hydrogen peroxide in the presence of a base such as sodium hydroxide. The 4β, 5β-oxido-19-nor-pregnan-3,20-dione thus formed is then reacted with concentrated hydrochloric or hydrobromic acid to form the desired 4-chloro or 4-bromo-19-nor-progesterone.

The following specific examples serve to illustrate but are not intended to limit the present invention.

*Example I*

A solution of 0.8 g. of 19-nor-progesterone in 100 cc. of methanol was cooled to 0° C. and slowly mixed with stirring with 3.5 cc. of 33% hydrogen peroxide solution and then with 3.5 cc. of 10% aqueous sodium hydroxide solution, while the temperature of the mixture was maintained below 0° C. The mixture was stirred at this temperature for one hour further, filtered and diluted with saturated aqueous sodium chloride solution. The product was extracted with three portions of ethyl acetate and the extract was washed with water, dried over anhydrous sodium sulfate, filtered and evaporated to dryness. There was thus obtained the crude 4β, 5β-oxido-19-nor-pregnan-3,20-dione. Chromatographic purification afforded the analytical sample.

0.8 g. of the above crude epoxide was dissolved in 40 cc. of acetone, the solution was cooled in an ice bath and then there was added 1.2 cc. of concentrated hydrochloric acid. The mixture was kept standing for one hour at room temperature and then it was poured into saturated aqueous sodium chloride solution; after cooling, the crystalline precipitate was collected by filtration. There was thus obtained the desired 4-chloro-19-nor-progesterone in crude form, M.P. 156–161° C. Several recrystallizations from acetone-hexane produced the pure substance which melted between 175 and 177° C.; $[\alpha]_D^{20}$ +127° (chloroform); ultraviolet absorption λ max. 256 mμ log E 4.11.

*Example II*

0.5 g. of the crude 4β, 5β-oxido-19-nor-pregnan-3,20-dione, obtained in accordance with the previous example, was dissolved in 30 cc. of acetone, cooled to 0° C. and then treated with 1.2 cc. of constant boiling aqueous hydrobromic acid (approximately 48%), following the method described in such example for the treatment with hydrochloric acid. There was thus obtained 4-bromo-19-nor-pregesterone.

We claim:
1. A compound of the following formula:

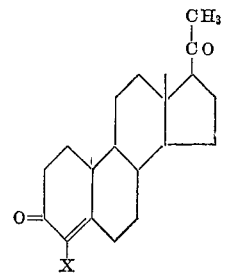

wherein X is selected from the group consisting of chlorine and bromine.
2. 4-chloro-19-nor-progesterone.
3. 4-bromo-19-nor-progesterone.

References Cited in the file of this patent
UNITED STATES PATENTS 2,842,571   Camerino et al. _____ July 8, 1958
2,933,510   Julian et al. _____ Apr. 19, 1960

OTHER REFERENCES

"Journal Chemical Society," 1956, pages 627–9, Kirk et al.
Camerino et al.: Formaco (Pavis), Ed. Sci., vol 13, pp. 52–63 (1958), or Chem. Abstracts, vol. 52, par. 13, 769(c).